April 20, 1954  L. ADAMS  2,675,685
REFRIGERATION APPARATUS
Filed Nov. 2, 1950  2 Sheets-Sheet 1

LOYD ADAMS,
INVENTOR.

BY *Lyon+Lyon*

ATTORNEYS.

April 20, 1954     L. ADAMS     2,675,685
REFRIGERATION APPARATUS
Filed Nov. 2, 1950     2 Sheets-Sheet 2

LOYD ADAMS,
INVENTOR.

BY Lyon & Lyon
ATTORNEYS.

Patented Apr. 20, 1954

2,675,685

UNITED STATES PATENT OFFICE 2,675,685

REFRIGERATION APPARATUS

Loyd Adams, Maywood, Calif., assignor of one-half to Frederick E. Johnson, Maywood, Calif.

Application November 2, 1950, Serial No. 193,715

3 Claims. (Cl. 62—24)

This invention relates to refrigeration apparatus and has particular reference to refrigeration apparatus for cooling the contents of a truck or truck trailer while the same is in transit.

One of the principal objects of my invention is to provide novel refrigeration apparatus for cooling the contents of trucks and truck trailers of the type used for cross-country hauling of perishable produce.

Another important object of my invention is to provide refrigeration apparatus positioned on the floor or bed of a truck or truck trailer and having novel means for adjustment in a direction longitudinally of the truck to conform to the size and arrangement of the load carried therein.

Another object of my invention is to provide refrigeration apparatus having a novel ice bunker with means for quick and efficient loading of ice therein.

A further object of my invention is to provide in-transit refrigeration apparatus for trucks and the like, which apparatus is simple and rugged, and adapted to be manufactured economically on a quantity basis.

Other objects and advantages of this invention it is believed will be apparent from the following detailed description of a preferred embodiment thereof as illustrated in the accompanying drawings.

Figure 1:
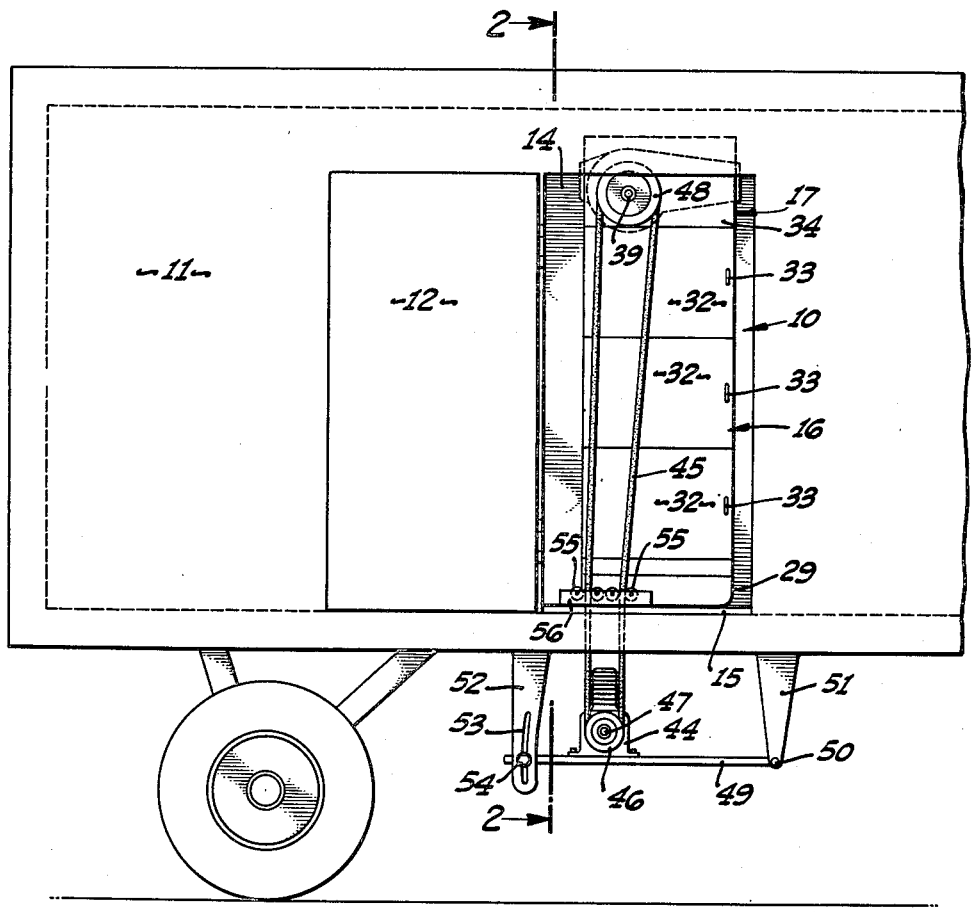
Figure 1 is a side elevation of a preferred embodiment of my invention, illustrating the same installed in position in the load-carrying space of a truck trailer.

Referring now to the drawings, the refrigeration unit, generally indicated at 10, which comprises a preferred embodiment of my invention, is illustrated installed in a conventional truck trailer 11. Such trailers are commonly provided with a central side door 12, shown here in open position, and insulated walls 13 surrounding the load-carrying space 14. The flooring 15 is generally made of a light, strong metal such as magnesium and is longitudinally corrugated as shown.

The refrigeration unit 10 includes a bunker unit 16 and a blower unit 17 removably mounted thereon. The bunker unit is provided with side walls 18 and 19 and an end wall 20 and extends transversely of the trailer as shown. The side walls are spaced by cross-bars 21 upon which are mounted a plurality of angles 23 forming a flooring for the ice 24, the angles being spaced apart as shown to provide drainage passages for water from the melting ice. The walls 18 and 19 are provided with inwardly and downwardly inclined bottom portions 25 and 26 which direct the water into the drip pan 27. The drip pan is secured to the bunker unit by means of a plurality of spaced V-shaped bars 28 which may be welded to the pan sides and bolted to the inclined bottom portions 25 and 26 of the bunker sides. The bunker unit is supported for sliding movement longitudinally of the trailer by means of curved runners 29 extending transversely of the bunker and secured to the V-shaped bars 28. The drip pan 27 has a drain opening 30 to which is connected a tube 31 of flexible material which extends through the flooring of the trailer to discharge the drip water exteriorly thereof. The flexible tube is formed into a loop 32 to provide sufficient slack to permit the desired amount of longitudinal movement of the bunker unit.

Figure 2:
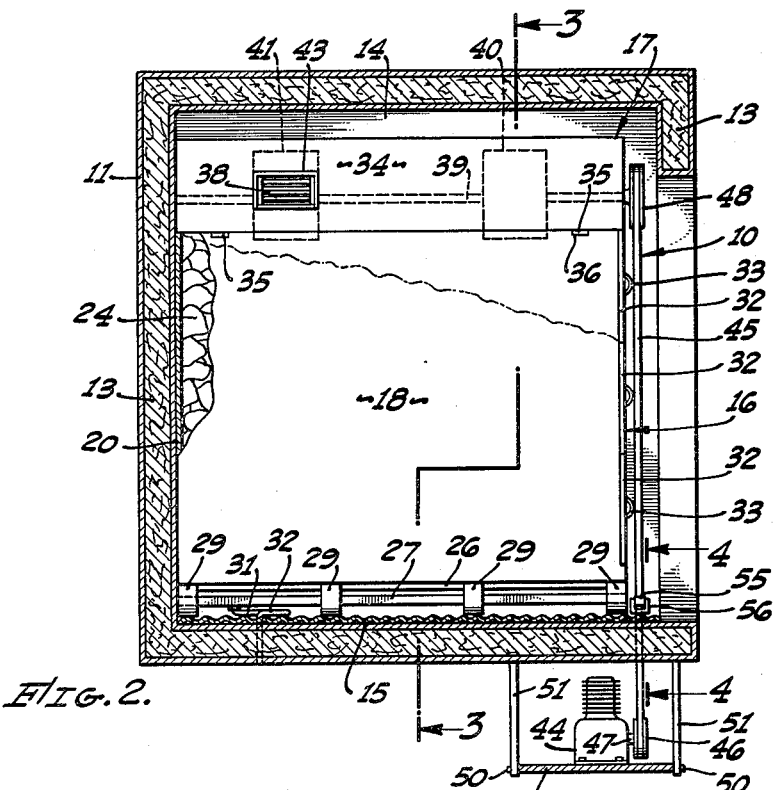
Figure 2 is a sectional elevation taken substantially on the line 2—2 of Figure 1.

A plurality of doors 32 form the front end of the bunker unit 16 and are provided with handles 33 and hinges (not shown) mounted on the side wall 18 for opening movement on a vertical axis. I have found that the charging of ice into the bunker is greatly facilitated by the arrangement of a series of vertically disposed doors, and that a greater load of ice may be charged into the bunker than would be possible with a single side door. Because of space limitations and the construction of the trucks and truck trailers, it is necessary to load the ice more or less horizontally through the trailer door 12, and hence, by opening all of the bunker doors 32 and then closing them successively from the bottom as the ice is built up in the bunker, a substantially full load of ice may be charged into the bunker (see Fig. 2). With a single door extending the entire height of the bunker, however, possibly only half of the bunker volume could be filled with ice since the ice naturally tends to form a diagonal leading from the upper portion of the end wall down to the bottom of the door opening.

The blower unit 17 includes a housing 34, generally rectangular in shape, which rests on the top of the bunker unit 16 and is held in place by means of transverse bars 35 secured to the housing, the ends of the bars seating in recesses 36 in the bunker walls 18 and 19. Mounted within the housing is a pair of fans 37 and 38 which are keyed to a shaft 39 journaled in suitable bearings (not shown). The fans are enclosed in volutely curved casings 40 and 41 having oppositely directed horizontal outlet conduits 42 and 43 for blowing cold air longitudinally of the trailer 11.

Means are provided for driving the shaft 39, and as shown in the drawings, these means may include the gasoline engine 44 mounted exteriorly of the trailer, and the belting 45 which runs between a pulley 46 on the engine shaft 47 and a pulley 48 on the shaft 39. The engine 44 is mounted for vertical adjustment, and as shown, is secured to a platform 49 which is pivotally connected at one end by means of pins 50, to vertical brackets 51 depending from the underside of the trailer body. The platform is connected at the other end to a pair of brackets 52, the brackets having curved slots 53 through which extend bolts 54 which are carried on the platform.

Figure 4:
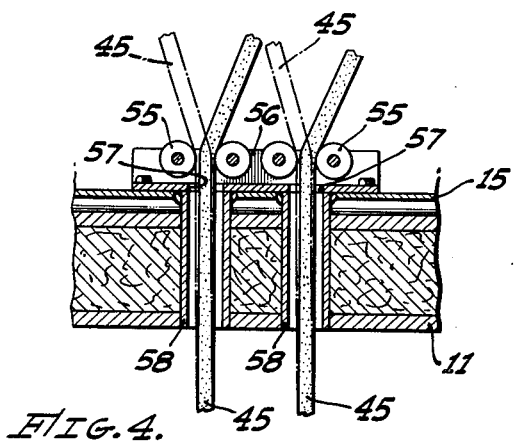
Figure 4 is a detail sectional elevation taken substantially on the line 4—4 of Figure 2.

As pointed out above, the bunker unit and the blower unit are movable longitudinally of the trailer, this to accommodate various loading arrangements. Accordingly, in order to avoid a long slot or slots in the floor of the truck with a consequent excessive loss of cold air therethrough, two pairs of rollers or idler pulleys 55 are mounted in a bracket 56 bolted to the floor of the truck, one pair of pulleys for each of the legs of the drive belt 45. The bracket is provided with apertures 57 leading to tubes 58 extending through the bottom wall of the trailer, through which apertures and tubes the belt is run. By this arrangement, the bunker unit may be moved in either direction longitudinally of the trailer, with appropriate adjustment of the engine platform 49, the phantom lines in Figure 4 illustrating the change-over of the belt legs from one pulley to the other. It will be understood that that portion of the belt between the pulleys 55 and the engine pulley 46 is thereby maintained in the same vertical path regardless of the position of the bunker unit and blower unit, and that therefore only a pair of relatively small openings in the trailer floor for the belt is required.

Figure 3:
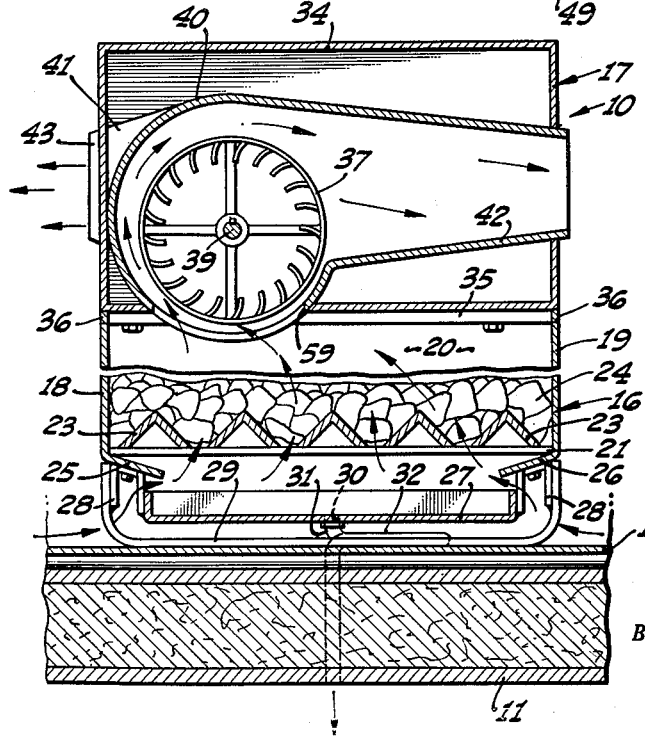
Figure 3 is a sectional elevation taken substantially on the line 3—3 of Figure 2.

For loading the bunker unit 16 with ice, the belt 45 is removed and the ice charged in successively through the respective doors 32, as described above. In operation air is drawn up through the ice, through the openings 59 in the casings 40, and the air thus cooled is blown longitudinally over the load toward either end of the trailer. This cold air is drawn down through the load and then under the load which is generally supported on pallets (not shown), along the corrugated flooring 15 to the bunker, where the then warm air is pulled, in the direction of the arrows in Figure 3, through the spaces between the runners 29 and through the spaces between the V-shaped bars 23 into the ice load to be recirculated.

Having fully described my invention, it is to be understood that I do not wish to be limited to the details herein set forth, but my invention is of the full scope of the appended claims.

I claim:

1. In apparatus for cooling the load of a vehicle having walls defining a load-carrying space, one of said walls having a pair of apertures therein the combination of a blower unit within the load-carrying space and adapted to be moved therein for positional adjustment, means associated with said blower unit for cooling air circulated thereby, a prime mover mounted exteriorly of the load-carrying space, an endless transmission element extending from said prime mover to said blower unit to drive the same, each leg of the transmission element being separately led through one of said apertures, and a pair of rotary elements mounted within the load-carrying space and adjacent each of the apertures in a position to be contacted by the endless transmission element to permit that portion of the endless transmission element above the rotary elements to be moved bodily with respect to that portion of the endless transmission element below the rotary elements.

2. In apparatus for cooling the load of a vehicle having walls defining a load-carrying space, one of said walls having a pair of apertures therein in the combination of a blower unit within the load-carrying space and adapted to be moved therein for positional adjustment, means associated with said blower unit for cooling air circulated thereby, a prime mover mounted exteriorly of the load-carrying space, an endless transmission element extending from said prime mover to said blower unit to drive the same, each leg of the transmission element being separately led through one of said apertures, and a pair of rotary elements mounted within the load-carrying space and adjacent each of said apertures and adjacent each of the apertures in a position to be contacted by the endless transmission element to permit that portion of the endless transmission element above the rotary elements to be moved bodily with respect to that portion of the endless transmission element below the rotary elements.

3. In apparatus for cooling the load of a vehicle having walls and a floor defining a load-carrying space, the combination of a blower unit positioned within the load-carrying space, means associated with said blower unit for cooling air circulated thereby, an engine vertically adjustably mounted below said floor and exteriorly of the load-carrying space, an endless transmission belt extending from said prime mover to the blower unit to drive the same, each leg of the belt being separately led through one of a pair of relatively small apertures in the floor, and a pair of pulleys mounted on the floor within the load-carrying space and adjacent each of the apertures in a position to be contacted by the belt to permit that portion of the belt above the pulley to be moved bodily with respect to that portion of the belt below the pulley.

References Cited in the file of this patent

UNITED STATES PATENTS

| Number | Name | Date |
|--------|------|------|
| 203,236 | Bate | May 7, 1878 |
| 389,143 | Frenier | Sept. 4, 1888 |
| 407,862 | Hanrahan | July 30, 1889 |
| 2,016,428 | Hasche | Oct. 8, 1935 |
| 2,060,482 | Ballinan | Nov. 10, 1936 |
| 2,235,607 | Carraway | Mar. 18, 1941 |
| 2,243,114 | Ness et al. | May 27, 1941 |
| 2,279,847 | Stebbins | Apr. 14, 1942 |
| 2,367,502 | Hulse | Jan. 16, 1945 |